United States Patent
Akiyama (10) Patent No.: US 7,409,090 B2
(45) Date of Patent: Aug. 5, 2008

(54) HANDWRITTEN CHARACTER INPUT DEVICE AND HANDWRITTEN CHARACTER INPUT PROCESSING METHOD

(75) Inventor: Katsuhiko Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 600 days.

(21) Appl. No.: 11/095,894

(22) Filed: Apr. 1, 2005

(65) Prior Publication Data
US 2005/0220344 A1    Oct. 6, 2005

Related U.S. Application Data

(63) Continuation of application No. PCT/JP03/05644, filed on May 2, 2003.

(51) Int. Cl.
*G06K 9/00* (2006.01)

(52) U.S. Cl. .................. 382/187; 382/181; 382/189; 382/216; 382/186; 382/315

(58) Field of Classification Search ............... 382/181, 382/189, 216, 186, 187, 315
See application file for complete search history.

(56) References Cited

U.S. PATENT DOCUMENTS 6,661,920 B1 * 12/2003 Skinner ................... 382/187
6,970,599 B2 * 11/2005 Longe et al. ............. 382/185

FOREIGN PATENT DOCUMENTS

| JP | 61-107468 | 5/1986 |
| JP | 05-225399 | 9/1993 |
| JP | 05-233611 | 9/1993 |
| JP | 06-223230 | 8/1994 |
| JP | 06-289983 | 10/1994 |
| JP | 2003-044214 | 2/2003 |
| JP | 2003-099713 | 4/2003 |
| JP | 2003-115032 | 4/2003 |

OTHER PUBLICATIONS

Robert M. Carr et al., Shin-OS: PenPoint, Nikkei Byte, Apr. 1991, pp. 236-249.

* cited by examiner

*Primary Examiner*—Matthew C. Bella
*Assistant Examiner*—Mike Rahmjoo
(74) *Attorney, Agent, or Firm*—Staas & Halsey LLP (57) ABSTRACT

The present invention provides a handwritten character input device and handwritten input character processing method enabling easy selection of a text input area and reliable input of handwritten characters, regardless of where the text input area is located. The handwritten character input device comprises a text input area setting unit for setting a text input area, a writing trace input unit for detecting a moving trace of a pointing device, a stroke condition judgment unit for judging whether the first or last stroke of the moving trace of the pointing device detected by the writing trace input unit satisfies a prescribed condition, an input area selection unit for selecting a text input area as a transmission destination of the character string information based on the judgment results of the stroke condition judgment unit, a writing trace processing unit for recognizing the character string information from the writing trace defined by the moving trace of the pointing device input by the trace input unit excluding the strokes judged by the stroke condition judgment unit to satisfy the prescribed condition, and a processing result transmission unit for transmitting the character string information recognized by the writing trace processing unit to the text input area selected by the input selection unit.

7 Claims, 6 Drawing Sheets

HANDWRITTEN CHARACTER INPUT DEVICE AND HANDWRITTEN CHARACTER INPUT PROCESSING METHOD

This is a continuation of International Application PCT/JP2003/005644, with an international filing date of May 2, 2003.

FIELD OF THE INVENTION

The present invention relates to a handwritten character input device and a handwritten character input processing method wherein handwritten input from a pointing device such as a stylus pen or a mouse is received and the input characters are recognized and input as character codes.

BACKGROUND OF THE INVENTION

A standard handwritten character input device comprises a tablet comprising a touch panel tablet that detects electronic signals arising through changes in pressure or static electricity superimposed on a display screen such as an LCD panel and a stylus pen for marking position on the tablet; based on position information of the stylus pen moving on the touch panel, a character input by handwriting is recognized. There are also handwritten character input devices such that position information of a mouse cursor on a monitor screen of a personal computer is acquired and character input by handwriting is recognized. In either case, a user moves a marking point on a display screen using a pointing device such as a stylus pen, mouse or the like, and inputs a desired handwritten character.

With such a handwritten character input device, there may be cases where a handwritten character input area that receives handwritten character input is set up independently, without any relation to other display information. In this case, there is the danger that a text input area that is set up as an input column and that displays handwritten character recognition results as text data may overlap the handwritten character input area. For example, with a mobile information terminal such as a personal digital assistant (PDA), for purposes of miniaturization there are limitations with respect to size of the display screen and this may lead to cases where the text input area is displayed at a position that interferes with the handwritten character input area. In such a case, it becomes difficult to confirm input handwritten character information.

Further, there may be cases where a handwritten character input area and text input area are the same. For example, a character input by handwriting is recognized and the recognized result is displayed in a text input area, and at the same time, trace information from a pointing device to be displayed in accordance with handwriting input is not displayed. In this case, it is necessary to make the handwritten character input area sufficiently large for making handwritten input; however, it is difficult to design such a text input area so that a large amount of data can be input therein.

A further conceivable case would be to have a user select in advance a text input area where input is to be performed, and have the entire screen serve as a handwritten character input area, accepting input of handwritten characters. In this case, to perform input of handwritten character, a user must switch between a command mode for selecting text input area and a handwritten input mode enabling handwritten input.

Another proposed handwritten character input device as disclosed in a laid-open Japanese Patent Application 2003-44214 (JP2003-44214A) is configured so that a text input area where a handwritten character is to be input is determined from the start point coordinates of the handwritten character input, and the recognition results of the recognized character are reflected in this text input area.

SUMMARY OF THE INVENTION

The handwritten character input device according to a first aspect of the present invention is a handwritten character input device wherein character string information input by handwriting is recognized based on a moving trace of a pointing device and the character string information for a text input area is transmitted, comprising a text input area setting unit for setting a text input area, a writing trace input unit for detecting a moving trace of a pointing device, a stroke condition judgment unit for judging whether the first or last stroke of the moving trace of the pointing device detected by the writing trace input unit satisfies a prescribed condition, an input area selection unit for selecting a text input area as a transmission destination of the character string information based on the judgment results of the stroke condition judgment unit, a writing trace processing unit for recognizing the character string information from the writing trace defined by the moving trace of the pointing device input by the trace input unit excluding the strokes judged by the stroke condition judgment unit to satisfy the prescribed condition, and a processing result transmission unit for transmitting the character string information recognized by the writing trace processing unit to the text input area selected by the input selection unit.

In this case, when the first or last stroke satisfies a prescribed condition, a text input area for transmission of the character string information can be selected based on that stroke, thus enabling easy selection of the text input area. As the character string information to be input is recognized from the moving trace of the pointing device excluding a stroke that satisfies the prescribed condition, the position where a handwritten character is to be input can be freely selected, and even when the text input area is positioned in a corner of the screen, input operation can be easily performed.

The handwritten input device according to a second aspect of the present invention is the handwritten character input device according to the first aspect, wherein, when the first stroke of a moving trace of a pointing device has a start point positioned within a text input area and is at least a prescribed length, the stroke condition judgment unit judges that the first stroke satisfies the condition, and the input area selection unit selects the text input area as a transmission destination for character string information.

In this case, with the first stroke as a leader line from the text input area, the handwritten input area can be set in any area.

The handwritten character input device according to a third aspect of the present invention is the handwritten character input device according to either first or second aspect, wherein, when the start point of the first stroke of a moving trace of a pointing device is positioned within one text input area and the distance between the end point of the first stroke and the start point of the second stroke is at least a prescribed length, the stroke condition judgment unit judges that the first stroke satisfies the condition.

In this case, based on the distance between the end point of the first stroke and the start point of the second stroke, it can be clearly judged that the first stroke is a leader line from the text input area.

The handwritten character input device according to a fourth aspect of the present invention is the handwritten character input device according to the first aspect, wherein, when the last stroke of a moving trace of a pointing device has as an end point a position within one text input area and is at least a prescribed length, the stroke condition judgment unit judges that the last stroke satisfies the condition and the input area selection unit selects the text input area as a transmission destination for the character string information by the input area selection unit.

In this case, the device can be configured so that writing trace information input by handwriting in any area is transmitted to the text input area designated by the last stroke.

The handwritten character input device according to a fifth aspect of the present invention is the handwritten character input device according to either of the first or fourth aspect, wherein, when the end point of the last stroke of a moving trace of a pointing device is positioned within one text input area and the distance between the start point of the last stroke and the end point of the second to last stroke is judged to be at least a prescribed length, the stroke condition judgment unit judges that the last stroke satisfies the condition.

In this case, based on the distance between the start point of the last stroke and the end point of the second to last stroke, it can be clearly judged that the last stroke is a leader line toward the text input area.

The handwritten character input processing method according to a sixth aspect of the present invention is a handwritten input processing method wherein handwritten character string information is recognized based on a moving trace of a pointing device and character string information for a text input area is transmitted, comprising a step for setting a text input area, a step for detecting a moving trace of a pointing device, a step for judging whether the first or last stroke of the moving trace of the pointing device satisfies a prescribed condition, a step for selecting a text input area as a transmission destination for the character string information based on judgment results, a step for recognizing the character string information from a writing trace excluding a stroke judged to satisfy the prescribed condition from a moving trace of a pointing device, and a step for transmitting the recognized character string information to a selected text input area.

In this case, when the first or last stroke satisfies the prescribed condition, the text input area where the character string information is to be transmitted can be selected based on such stroke, enabling easy selection of the text input area. As the character string information to be input is recognized from the moving trace of the pointing device excluding a stroke that satisfies the prescribed condition, the position where a handwritten character is to be input can be freely selected by a user, and even when the text input area is positioned in a corner of a screen, input operation can be easily performed.

The program according to a seventh aspect of the present invention is a handwritten character input processing program wherein handwritten input character string information is recognized based on a moving trace of a pointing device and the character string information for a text input area is transmitted, wherein a computer is caused to execute a handwritten character input processing method comprising a step for setting a text input area, a step for detecting a moving trace of a pointing device, a step for judging whether the first or last stroke of the moving trace of the pointing device satisfies a prescribed condition, a step for selecting a text input area as a transmission destination of the character string information based on the judgment result, a step for recognizing the character string information from a writing trace excluding a stroke judged to satisfy the prescribed condition from the moving trace of the pointing device, and a step for transmitting the recognized character string information to the selected text input area.

Installing such program in a computer enables the computer to function as a handwritten character input device, and thus enables a text input area to be selected based on the first or last stroke and the character string information to be transmitted to the text input area.

DESCRIPTION OF THE PREFERRED EMBODIMENT

In a handwritten character input device as described in the above JP2003-44214A, handwritten character input must be performed within a text input area, and if this text input area is in a corner of a screen, there is a problem that handwritten input therein is difficult.

The present invention provides a handwritten character input device and handwritten input character processing method enabling easy selection of a text input area and reliable input of handwritten characters, regardless of where the text input area is located.

The handwritten character input device and handwritten character input processing method relating to the present invention can be realized by a display integrated tablet comprising a touch panel that detects electronic signals arising through changes in pressure or static electricity superimposed on an LCD, CRT or other display screen, and a computer that detects a moving trace on the tablet marked by marking means such as a stylus pen, having installed therein character recognition software for judging character string information based on the moving trace and causing the same to be reflected on the tablet display.

Further, the handwritten character input device and handwritten character input processing method according to the present invention can be used in a case of a configuration such that a handwritten character input area for inputting a handwritten character is set on a display of a standard personal computer, a moving trace marked by a pointing device such as a mouse, trackball or the like is detected, and the character string information based thereupon is reflected on the display.

Figure 1:
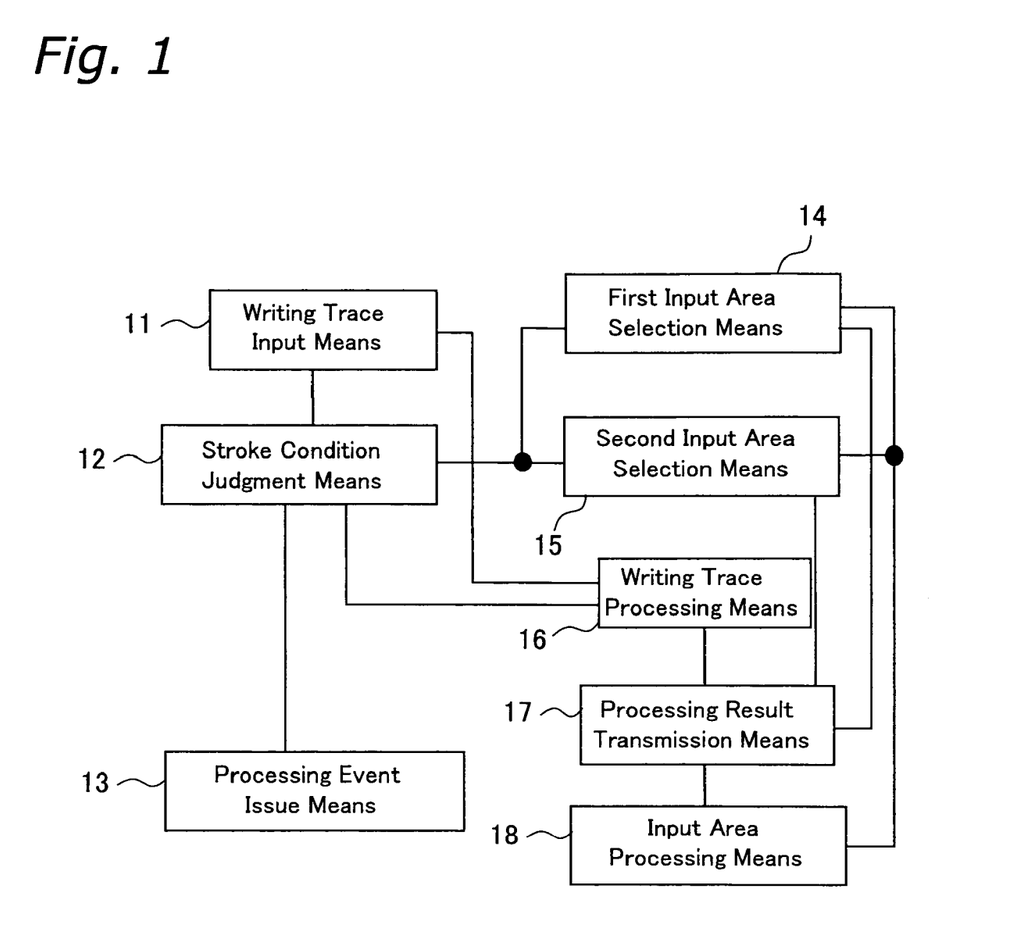
FIG. 1 is a functional block diagram of a handwritten character input device employing a first embodiment of the present invention.

FIG. 1 is a functional block diagram showing an outline of the constitution of a handwritten character input device employing a first embodiment of the present invention.

A handwritten character input device 1 comprises writing trace input means 11, stroke condition judgment means 12, processing event issue means 13, first input area selection means 14, second input area selection means 15, writing trace processing means 16, processing result transmission means 17 and input area processing means 18.

Writing trace input means 11 comprises a combination of a tablet and a stylus pen, mouse, trackball or other pointing device, and an interface for acquiring moving trace information as marked by the pointing device. For example, the moving trace of a pointing device operated by a user is obtained as a coordinate string of writing points in time series, and coordinates $(xi1, yi1), (xi2, yi2), \ldots (xini, yini)$, representing a coordinate string for the i-th stroke, and the number of strokes m are stored in storage means, where ni indicates the n-th coordinates of the i-th stroke.

Input area processing means 18 comprises a plurality of data relating to a text input area for receiving character string information and displays a text input area on a prescribed display position on a display screen. The text input area is configured, for example, so as to display a rectangular frame and set the area contained therein as a text input area.

Processing event issue means 13 generates at a prescribed timing a processing request signal; it generates a processing request signal for commencing character recognition processing when, for example, keystroke input has been received instructing commencement of character recognition after handwritten input, when the marking position of a pointing device has stopped for at least a prescribed time, or when a stylus pen has been separated from a tablet screen for at least a prescribed time.

Stroke condition judgment means 12 judges whether the first or last stroke satisfies a prescribed condition based on moving trace information from a pointing device input by writing trace input means 11. For example, when the start point $(x11, y11)$ of the coordinate string of the first stroke is positioned within a text input area managed by input area processing means 18 and the length of the first stroke exceeds a prescribed value, the first stroke is judged to have satisfied the prescribed condition. No particular limitation is placed on the prescribed value here as it will change depending on the tablet screen size, and may be determined as appropriate by the size of a screen or input character; for example, it may be set at 5 cm for a large screen or 3 cm for a small screen such as that of a PDA.

A configuration is possible such that when, with respect to the first stroke, the start point $(x11, y11)$ is within a text input area and the y-coordinate distance $|y11-y1n1|$ between the start point $(x11, y11)$ and end point $(x1n1, y1n1)$ is at least a prescribed value (when the writing is left to right), or the x-coordinate distance $|x11-x1n1|$ between the start point $(x11, y11)$ and end point $(x1n1, y1n1)$ is at least a prescribed value (when the writing is vertical), or the distance between the first stroke end point $(x1n1, y1n1)$ and second stroke start point $(x21, y21)$ is at least a prescribed value, it is judged that the prescribed condition has been satisfied. Further, a configuration is possible such that when, with respect to the m-th stroke, which is the last stroke, the end point $(xmnm, ymnm)$ is within a text input area and the distance between the start point $(xm1, ym1)$ and end point $(xmnm, ymnm)$ exceeds a prescribed value, or the y-coordinate distance $|ym1-ymnm|$ between the start point $(xm1, ym1)$ and end point $(xmnm, ymnm)$ is at least a prescribed value, it is judged that this final stroke satisfies the prescribed condition. Conceivable alternatives to calculating the y-coordinate distance include calculating the x-coordinate distance, calculating the linear distance between the start point and end point, and calculating precise stroke length.

First input area selection means 14, when stroke condition judgment means 12 judges that the first and last strokes fail to satisfy the prescribed condition, selects a text input area for reflecting an input handwritten character. For example, the maximum and minimum coordinate values are calculated from the coordinate string of each stroke input by writing trace input means 11, determination is made of the text input area in which the central point is included or which text input area is the closest, and a text input area for reflecting the handwritten input character string information is specified. Alternatively, a configuration is also possible such that determination is made of the text input area in which the start point $(x11, y11)$ of the first stroke is included, and such text input area is selected.

Second input area selection means 15, when the stroke condition judgment means 12 judges that the first or last stroke satisfies a prescribed condition, selects a text input area based on the stroke judged to have satisfied the prescribed condition. For example, when the first stroke satisfies the condition, the text input area where the start point $(x11, y11)$ of the first stroke is positioned can be selected. Alternatively, when the last stroke satisfies the condition, the text input area where the end point $(xmnm, ymnm)$ of the last stroke is positioned can be selected.

When stroke condition judgment means 12 judges that the first or last stroke satisfies the prescribed condition, writing processing means 16 performs character recognition, processes the form and generates character string information based on the strokes excluding that judged to have satisfied the condition. When stroke condition judgment means 12 judges that the first or last stroke fails to satisfy the prescribed condition, stroke processing means 16 performs character recognition, processes the form, and generates character string information based on all of the strokes input by the writing trace input means 11. The processing performed by the writing processing means 16 includes, in addition to character recognition processing, pattern recognition, shrinking and/or enlarging of a writing trace, and other processing; for the foregoing, various processing methods have been proposed, and detailed explanation thereof will be omitted here. The processing result from stroke processing means 16, when, for example, character recognition processing has been performed, is output as a character code string, and when a writing trace has been subject to shrinkage, writing point string information that has undergone shrinkage is output.

Processing result transmission means 17 transmits processing result data generated by writing processing means 16 to input area processing means 18 so that such data is reflected in the text input area selected by first input area selection means 14 or second input area selection means 15. Possible processing result transmission methods from processing result data transmission means 17 to input area processing means 18 include transmission via RAM and transmission via a communication channel.

Processing result transmission means 17 causes the processing result data transmitted from processing result transmission means 16 to be reflected in the selected text display area by, for example, output to a VRAM for display.

Figure 2:
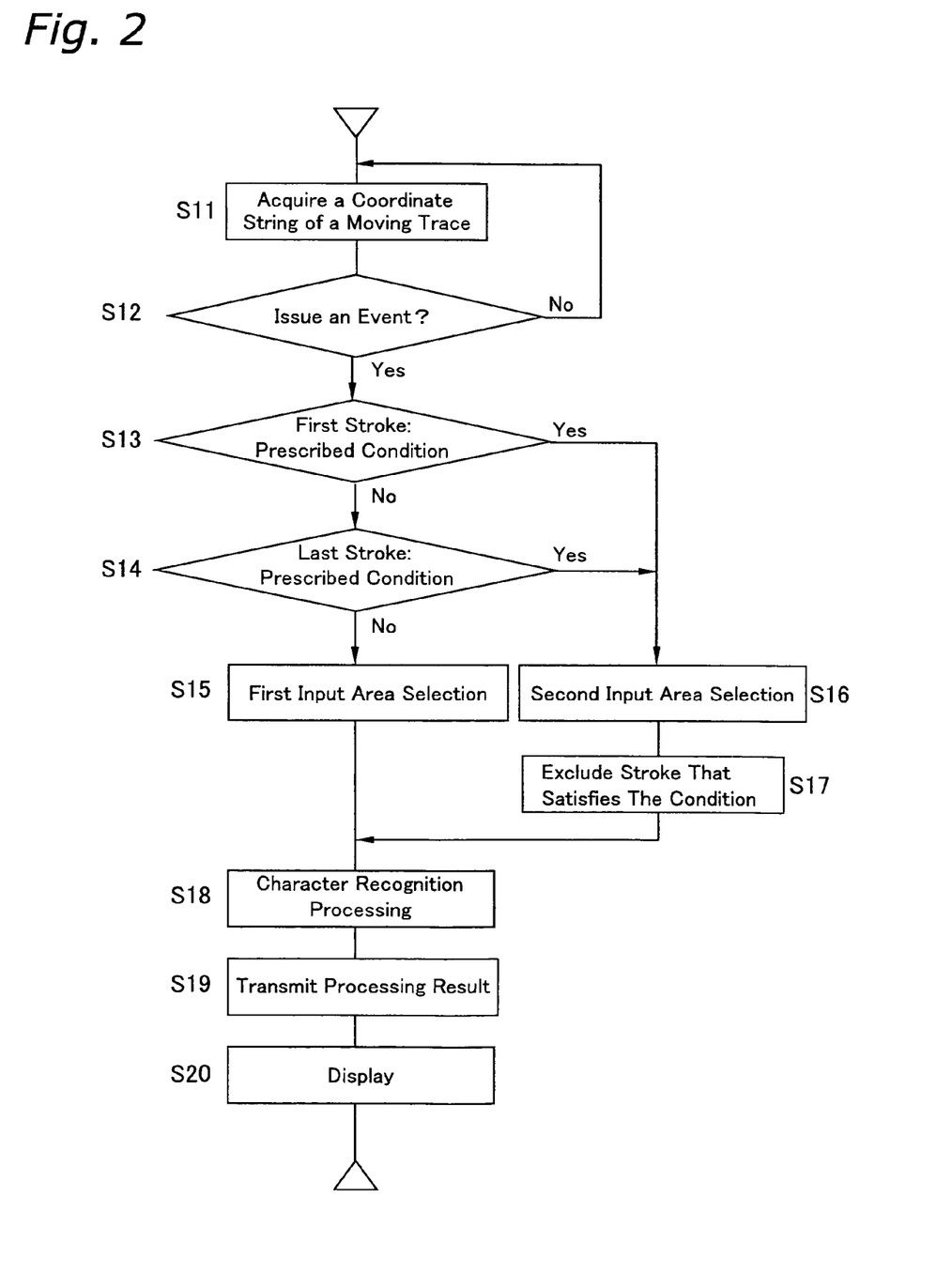
FIG. 2 is a control flow chart thereof.

Operations of the handwritten character input device relating to the present invention will be explained with reference to the control flow chart illustrated in FIG. 2.

Figure 3:
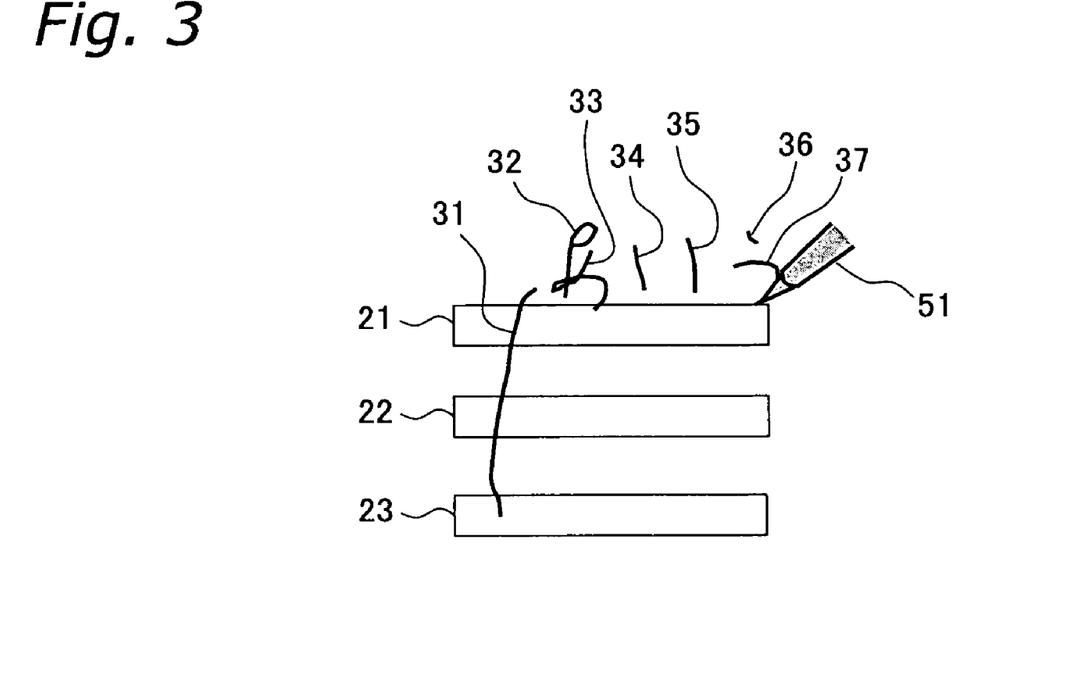
FIG. 3 is a diagram for explaining a handwritten input example.

Input area processing means 18 manages a text input area for receiving handwritten character input, and sets and displays the text input area on a screen. As an example, a case will be considered here where a text input area managed by display area processing means 18, as illustrated in FIG. 3, comprises three text input areas 21, 22, 23. In this case, first, display position setting of each text input area 21, 22, 23 is performed and based on the set display position, a display is made indicating an input area for each input areas 21, 22, 23, by means of a rectangular frame, underlining or other method.

In step S11, a coordinate string of a moving trace of a pointing device operated by a user is acquired. For example, coordinates for the position of a stylus pen tip moving on a tablet surface is read in time series and these are acquired as a coordinate string of the moving trace. Alternatively, in the same manner, the moving trace of a mouse cursor can be acquired.

In step S12, determination is made whether a processing request event for starting character recognition has been issued. When processing event issue means 13 judges that a processing request event has not been issued, control proceeds to step S11, and acquisition of a coordinate string arising from moving trace of a pointing device is continued; when a user has input a prescribed keystroke or when a prescribed time has passed since movement stop of a pointing device or when a stylus pen has been separated from the tablet screen for at least a prescribed time, it is judged that a processing request event has been issued and control proceeds to step S13.

In step S13, it is judged whether the first stroke satisfies a prescribed condition set in advance. As described above, for example, in one possible configuration, when the start point (x11, y11) of a coordinate string of the first stroke is within a text input area managed by the input area processing means 18 and the length of the first stroke exceeds a prescribed value, it can be judged that the prescribed condition has been satisfied. In the case described here, the start point (x11, y11) of the first stroke is within a text input area managed by input area processing means 18; however, a case where only the end point (x1n1, y1n1) of the first stroke is within an input area can also be set as a judgment condition.

In a case where the strokes input by writing trace input means 11, as illustrated in FIG. 3, are a first stroke 31 through seventh stroke 37, when the start point of the first stroke 31 is positioned within a text input area 23 and the first stroke 31 is judged to be longer than the length in the y-coordinate direction of each text input area, the first stroke 31 can be judged to be a leader line from the text input area 23. In this way, when the first stroke is judged to satisfy the prescribed condition, control proceeds to step S16, and when the first stroke is judged not to satisfy the prescribed condition, control proceeds to step S14.

In step S14, it is judged whether the last stroke satisfies a prescribed condition set in advance. In this case as well, as described above, for example, when the end point (xmnm, ymnm) of the m-th stroke (which is the last stroke) is within a text input area and the distance between the start point (xm1, ym1) and end point (xmnm, ymnm) exceeds a prescribed value, this last stroke can be judged to have satisfied a prescribed condition. In this case as well, a prescribed condition can be set for a case where the start point (xm1, ym1) of the last stroke is within an input area.

Figure 5:
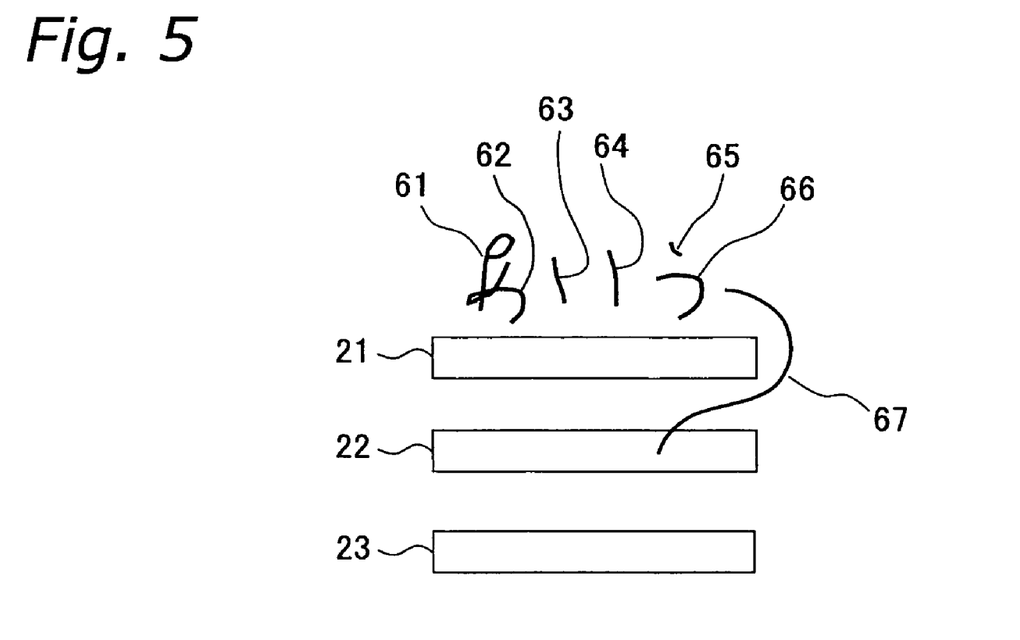
FIG. 5 is a diagram for explaining a handwritten input example.

In a case where the strokes input by the writing trace input means 1, as illustrated in FIG. 5, are a first stroke 61 through seventh stroke 67, when the end point of the seventh stroke 67 is positioned within a text input area 22 and the seventh stroke 67 is judged to be longer than the length in the y-coordinate direction of each text input area, the seventh stroke 67 can be judged to be a marker line that gives instruction for input in the text input area 22. In this way, when the last stroke is judged to satisfy a prescribed condition, control proceeds to step S16, and when last stroke is judged not to satisfy a prescribed condition, control proceeds to step S15.

Figure 7:
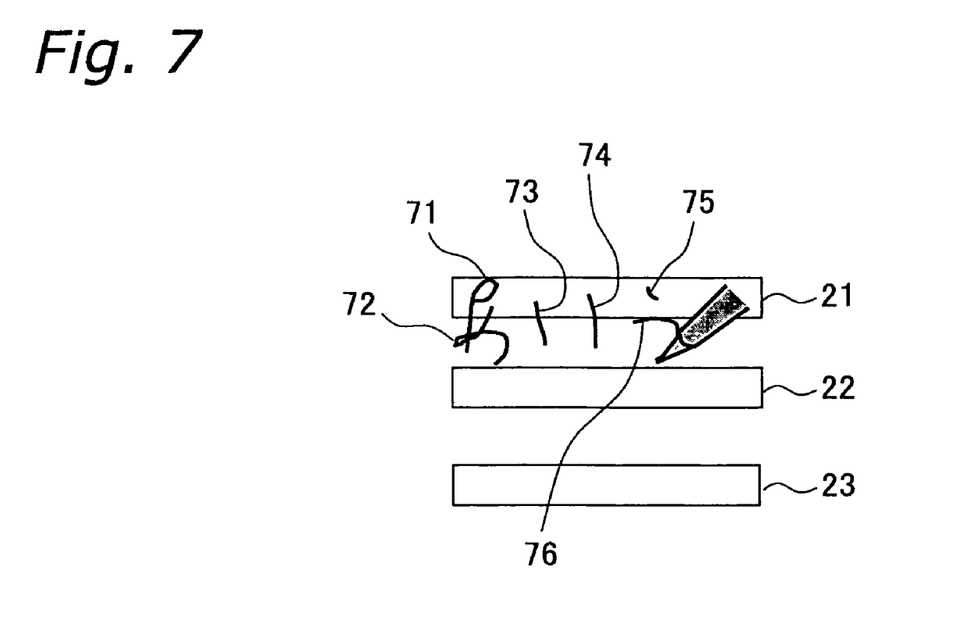
FIG. 7 is a diagram for explaining a handwritten input example.

In step S15, a text input area is selected by first input area selection means 14. As both of the first and last strokes fail to satisfy the prescribed condition set in advance, character recognition is performed based on all the writing trace information including the first and last strokes, and at the same time, a text input area to which the processing result is to be transmitted is selected based on all the writing trace information. For example, as illustrated in FIG. 7, when writing trace information comprising a first stroke 71 through sixth stroke 76 is made by writing trace input means 11, a text input area (text input area 21 in FIG. 7) in which the coordinates of the start point of the first stroke 71 are positioned can be selected.

In step S16, a text input area is selected by second input selection means 15. A configuration is possible such that a text input area in which the start point of the first stroke or the end point of the last stroke is positioned can be selected. In the example illustrated in FIG. 3, the text input area 23 in which the start point of the first stroke 31 is positioned is selected and in the example illustrated in FIG. 5, the text input area 22 in which the end point of the seventh stroke (last stroke) 67 is positioned is selected.

In step S17, a stroke that satisfies the condition is excluded from character recognition processing. For example, in the example illustrated in FIG. 3, the first stroke 31 is excluded, so that the second stroke 32 through seventh stroke 37 are subject to character recognition processing, and in the example illustrated in FIG. 5, the seventh stroke 67 is excluded, so that the first stroke 61 through sixth stroke 66 are subject to character recognition processing.

In step S18, character recognition processing of strokes subject to such processing is performed. In the example illustrated in FIG. 3, character recognition is performed for the second stroke 32 through seventh stroke 37, excluding the first stroke 31; in the example illustrated in FIG. 5, character recognition is performed for the first stroke 61 through sixth stroke 66, excluding the seventh stroke 67; and in the example illustrated in FIG. 7, character recognition is performed for all of the first stroke 71 through sixth stroke 76.

In step S19, the result of character recognition processing is transmitted. The character recognition processing result is converted into a character code string and transmitted from processing result transmission means 17 to input area processing means 18.

Figure 4:
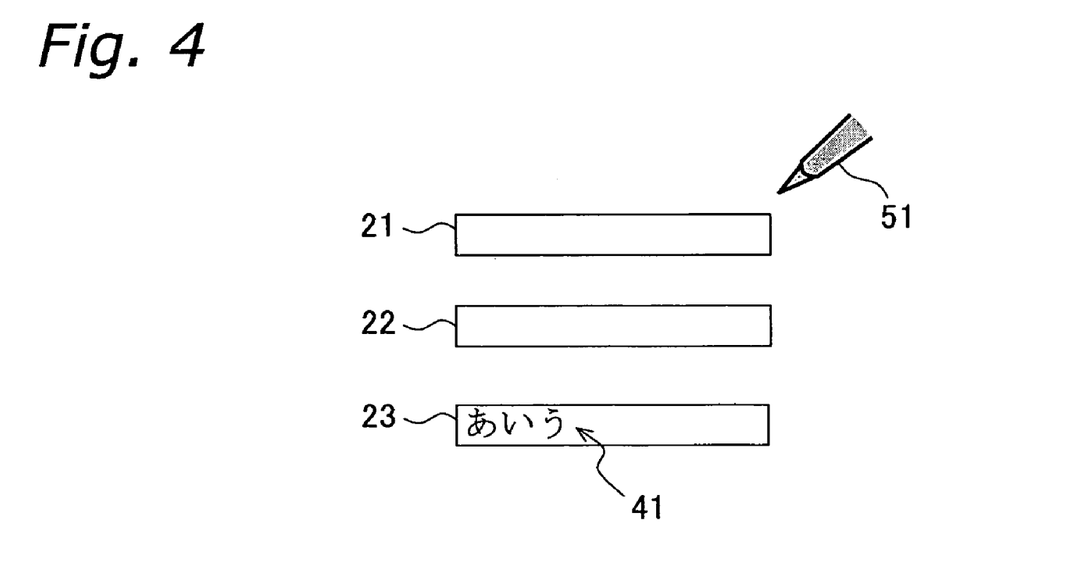
FIG. 4 is a diagram for explaining a display example thereof.
Figure 6:
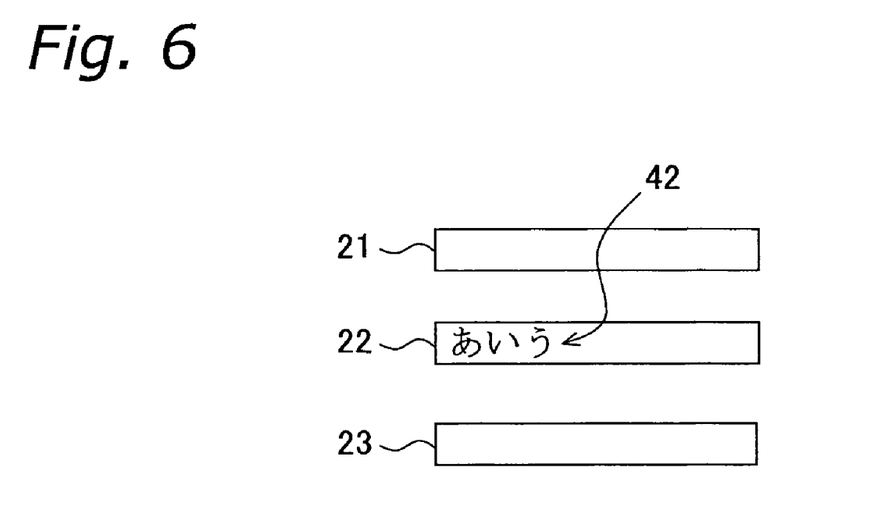
FIG. 6 is a diagram for explaining a display example thereof.
Figure 8:
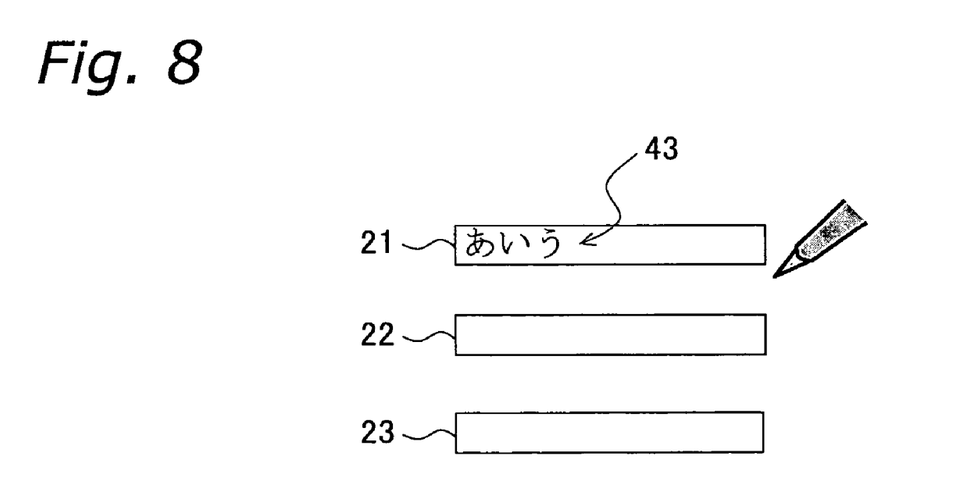
FIG. 8 is a diagram for explaining a display example thereof.

In step S20, character string information for a selected text input area is displayed based on the transmitted processing result. In the example illustrated in FIG. 3, in the selected text input area 23, the character string information 41 of "a, i, u," which is the character recognition result for the strokes excluding the first stroke 31, is displayed (see FIG. 4). Further, in the example illustrated in FIG. 5, in the selected text input area 22, the character string information 42 of "a, i, u," which is the character recognition result for the strokes excluding the seventh stroke 67, is displayed (see FIG. 6). In the example illustrated in FIG. 7, in the text display area 21 in which the start point of the first stroke 71 is positioned, the character string information 43 of "a, i, u," which is the character recognition result for all of the strokes, is displayed (FIG. 8).

In such a constitution, when, for example, wishing to input character information by handwritten input in the text input area 23, which is positioned lowest of the text input areas 21, 22, 23, by using the stylus pen 51 to draw a leader line having a point within the text input area 23 as the start point, subsequent moving traces by the stylus pen are taken to be handwritten character input.

Further, as illustrated in FIG. 5, subsequent to handwritten character input, by drawing a marker line to a text input area where input is desired, input can be easily made in such input area.

In the explanation of operations made using this control flow chart, a description is given of character recognition of handwritten input characters. Alternatively, a configuration is possible where pattern recognition is performed, as well as a configuration where shrinking and/or enlarging of the writing traces is performed.

For the prescribed condition to be satisfied by the first or last stroke, the judging precision can be improved by giving consideration to the writing speed for that stroke or difference in writing time from an adjacent stroke.

Further, a configuration is possible where a threshold value is adjusted by the vector direction formed by the start point and end point of the first or last stroke.

The discussions above relate to cases where a first or last stroke designates an input area; alternatively, the input area can be designated during the course of character string input. In this case, it is judged whether each input stroke satisfies a prescribed condition, and when it is judged that character input of all strokes has been completed, character recognition is performed using strokes excluding those satisfying a prescribed condition, and character string information is transmitted to a designated input area.

Figure 9:
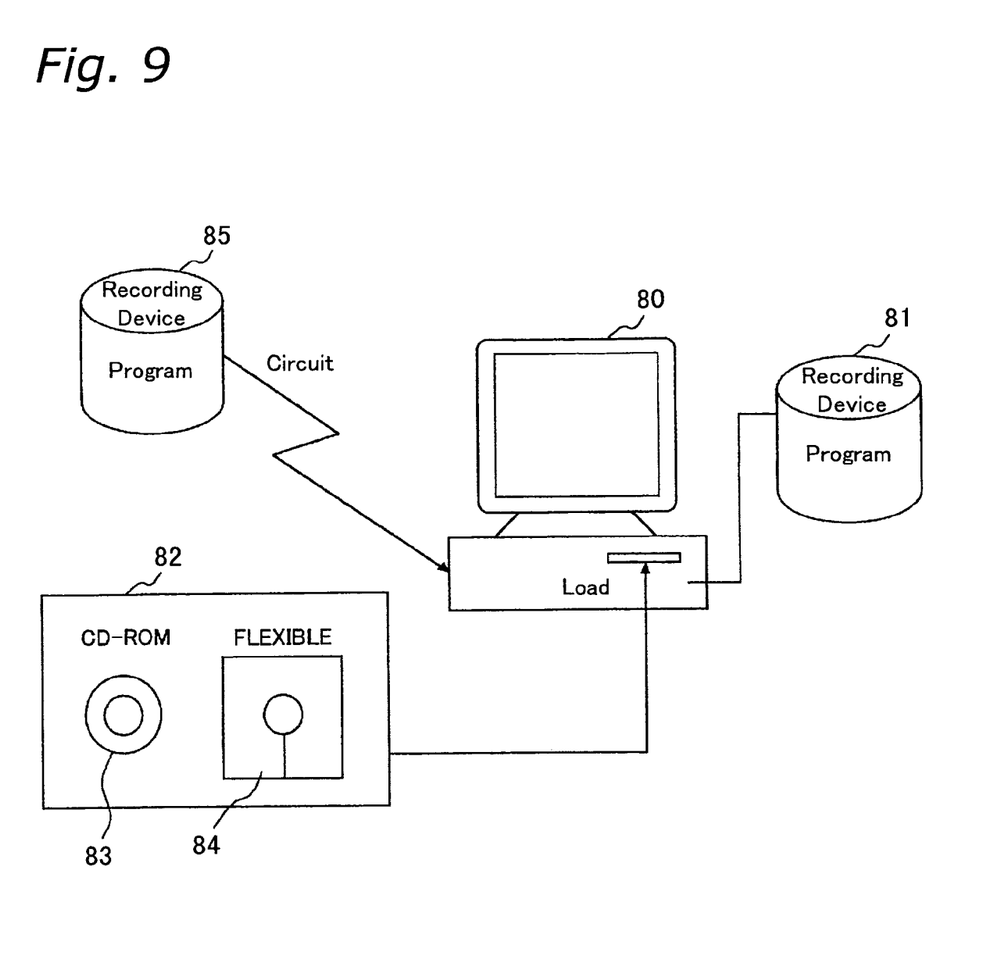
FIG. 9 is a diagram for explaining a recording medium for storing the program of the present invention.

A program for realizing the handwritten character input device and a handwritten character input processing method relating to the embodiment of the present invention, as illustrated in FIG. 9, may be recorded on portable recording media 82 such as a CD-ROM 83 or flexible disk 84, another recording device 85 at the end of a communication circuit, or a recording media 81 such as a hard disk and RAM of a computer 80, and at time of execution loaded onto the primary memory of the computer 80 and executed.

The present invention provides an interface enabling easy selection of an input area and enabling easy input when making handwritten input, even when an input area is in a corner of the screen or when input is to be made in a narrow area.

The invention may be embodied in other forms without departing from the spirit or essential characteristics thereof. The embodiments disclosed in this application are to be considered in all aspects as illustrative and not limiting. The scope of the invention is indicated by the appended claims rather than by the foregoing description, and all changes which come within the meaning and range of equivalency of the claims are intended to be embraced therein.

What is claimed is:

1. A handwritten character input device wherein handwritten character string information is recognized based on a moving trace of a pointing device and the character string information for a text input area is transmitted, comprising:
    a text input area setting unit for setting the text input area;
    a writing trace input unit for detecting the moving trace of the positioning device;
    a stroke condition judgment unit for judging whether the first or last stroke of the moving trace of the pointing device detected by the writing trace input unit satisfies a prescribed condition;
    an input area selection unit for selecting a text input area as a transmission destination for the character string information based on the judgment result of the stroke condition judgment unit;
    a writing trace processing unit for recognizing character string information from writing traces excluding a stroke judged to satisfy the prescribed condition by the stroke condition judgment unit based on the moving trace of pointing device input by the writing trace input unit; and
    a processing result transmission unit for transmitting character string information recognized by the writing trace processing unit to a text input area selected by the input area selection unit.

2. A handwritten character input device according to claim 1, wherein, when the first stroke of the moving trace of the pointing device has a start point positioned within a text input area and is at least a prescribed length, the stroke condition judgment unit judges that the first stroke satisfies the condition, and the input area selection unit selects the text input area as a transmission destination for the character string information.

3. A handwritten character input device according to either claim 1 or claim 2, wherein, when the start point of the first stroke of the moving trace of the pointing device is positioned within a text input area and the distance between the end point of the first stroke and the start point of the second stroke is at least a prescribed length; the stroke condition judgment unit judges that the first stroke satisfies the condition.

4. A handwritten character input device according to claim 1, wherein, when the last stroke of the moving trace of the pointing device has an end point positioned within the text input area and is at least a prescribed length, the stroke condition judgment unit judges that the last stroke satisfies the condition and the text input area is selected as the transmission destination for the character string information by the input area selection unit.

5. A handwritten character input device according to either claim 1 or claim 4, wherein, when the end point of the last stroke of the moving trace of the pointing device is positioned within one text input area and the distance between the start point of the last stroke and the end point of the second stroke from the last is at least a prescribed length, the stroke condition judgment unit judges that the last stroke satisfies the condition.

6. A handwritten character input processing method wherein handwritten input character string information is recognized based on a moving trace of a pointing device and the character string information for a text input area is transmitted, comprising:
    a step for setting the text input area;
    a step for detecting the moving trace of the pointing device;
    a step for judging whether the first or last stroke of the moving trace of the pointing device satisfies a prescribed condition;
    a step for selecting a text input area as a transmission destination for the character string information based on the judged result;
    a step for recognizing character string information from writing traces excluding a stroke judged to have satisfied the prescribed condition based on the moving trace of the pointing device; and
    a step for transmitting the recognized character string information to the selected text input area.

7. At least one computer-readable medium storing a program for causing a computer to execute operations, comprising:

setting a text input area for inputting a handwritten character string information;

detecting a moving trace of a pointing device;

judging whether the first or last stroke of the moving trace of the pointing device satisfies a prescribed condition;

selecting a text input area as a transmission destination of the character string information based on the judged result;

recognizing character string information from writing traces excluding a stroke judged to have satisfied the prescribed condition based on the moving trace of the pointing device; and transmitting the recognized character string information to the selected text input area.

* * * * *

UNITED STATES PATENT AND TRADEMARK OFFICE
CERTIFICATE OF CORRECTION

PATENT NO. : 7,409,090 B2  Page 1 of 1
APPLICATION NO. : 11/095894
DATED : August 5, 2008
INVENTOR(S) : Katsuhiko Akiyama It is certified that error appears in the above-identified patent and that said Letters Patent is hereby corrected as shown below:

Column 10, Line 21, change "length;" to --length,--.

Signed and Sealed this

Eleventh Day of November, 2008

JON W. DUDAS
*Director of the United States Patent and Trademark Office*